June 11, 1935.  O. B. ANDREWS  2,004,098
DEVICE FOR PACKAGING BAKERY PRODUCTS
Filed Aug. 31, 1932  2 Sheets-Sheet 1
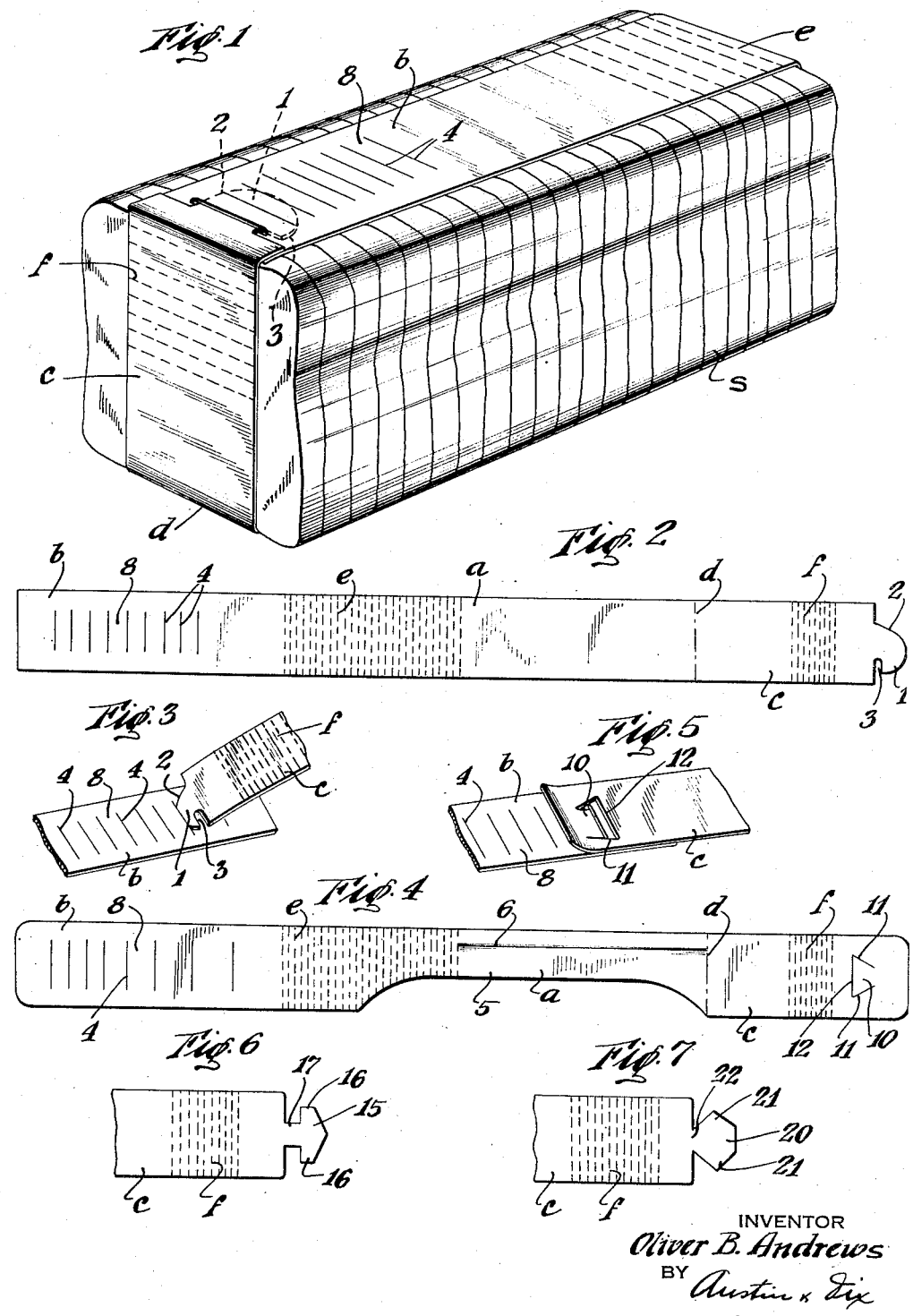
INVENTOR
Oliver B. Andrews
BY Austin & Dix
ATTORNEYS June 11, 1935.  O. B. ANDREWS  2,004,098
DEVICE FOR PACKAGING BAKERY PRODUCTS
Filed Aug. 31, 1932   2 Sheets-Sheet 2
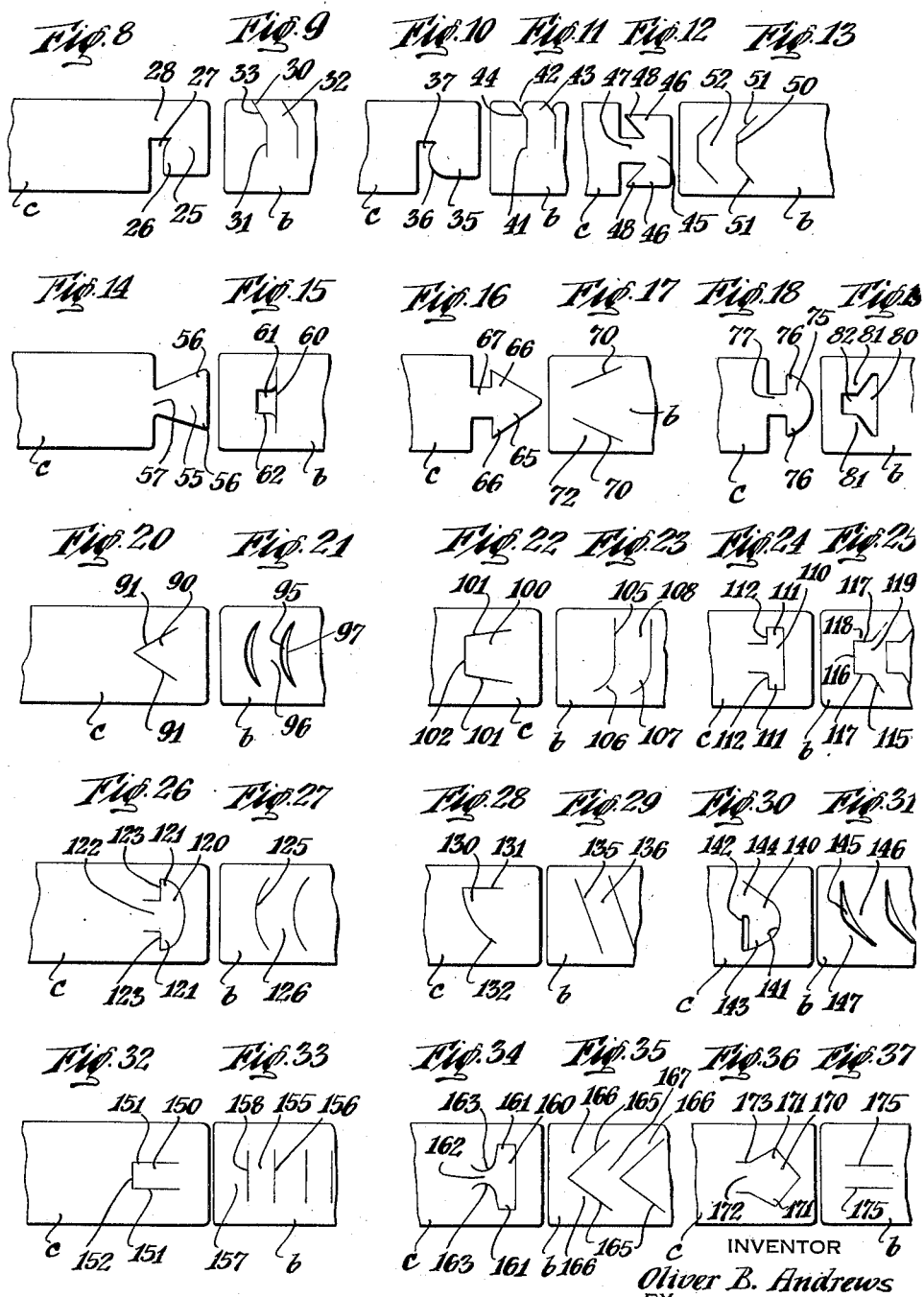
INVENTOR
Oliver B. Andrews
BY
ATTORNEYS Patented June 11, 1935

2,004,098

UNITED STATES PATENT OFFICE 2,004,098

DEVICE FOR PACKAGING BAKERY PRODUCTS

Oliver B. Andrews, Chattanooga, Tenn.

Application August 31, 1932, Serial No. 631,139

11 Claims. (Cl. 24—17)

This invention relates to device for packaging bakery products and more particularly to a band of paperboard material adapted to encircle baked articles to protect the same against damage and to retain them in the desired shape and form.

It has been found desirable to band together bread, cakes, cookies, wafers, doughnuts, crackers and other bakery products to protect the same against exposure and injury, and to so hold the individual pieces as to prevent the undue evaporation and dissipation of the moisture and flavor qualities of the material. This band is especially adapted for the banding together into package form of a number of separate pieces of the baked article, as for example, a plurality of slices of baked bread which make up the bread loaf. A packaging device which meets the requirements of the trade and the convenience of the baker must be low in first cost, strong and durable in use, easy and quick to apply, and flexible and/or adjustable to accommodate different shapes and sizes which each individual product necessarily assumes when removed from the baking ovens. Where a large quantity of baked articles must be packaged daily, it is of utmost importance that the band be provided with such securing devices that are not only inexpensive, but permit rapid and positive attachment and detachament.

An object of this invention is to provide a device for packaging baked products which can be rapidly and effectively applied to the baked material.

Another object of my invention is to provide a band especially adapted for the packaging of sliced bread and the like, which is provided with adjustable securing devices which can be quickly connected by unskilled labor, which securely holds under all conditions of handling, and which can be detached and re-connected by the housewife as various pieces of baked product is consumed or used.

Another object of my invention is to provide a band especially adapted for the packaging of sliced bread, which fully protects the slices from exposure and drying, which can be neatly and tightly applied to the loaf, which conforms to the contour and size of different loaves, and which can be rapidly attached and detached by the baker and by the housewife.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a perspective view of a loaf of sliced bread having a bread band attached thereto;

Fig. 2 is a face view of the bread band shown in Fig. 1, in extended position;

Fig. 3 is a perspective view of the ends of the bread band shown in Fig. 2 in the process of being connected together;

Fig. 4 is a face view of a bread band of somewhat different construction and provided with a modified hook device;

Fig. 5 is a perspective view of the ends of the bread band shown in Fig. 4 about to be connected or joined together;

Fig. 6 is a face view of a bread band having a modified hook portion;

Fig. 7 is a face view of a bread band having a hook portion of further modified form;

Fig. 8 is a face view of the end of a bread band having a hook portion of further modified form;

Fig. 9 is a face view of one end of a bread band provided with modified means with which the hook part of the band engages;

Fig. 10 is a face view of the end of a bread band having a hook portion of further modified form;

Fig. 11 is a face view of one end of a bread band provided with modified means with which the hook part of the band engages;

Fig. 12 is a face view of the end of a bread band having a hook portion of further modified form;

Fig. 13 is a face view of one end of a bread band provided with modified means with which the hook part of the band engages;

Fig. 14 is a face view of the end of a bread band having a hook portion of further modified form;

Fig. 15 is a face view of one end of a bread band provided with modified means with which the hook part of the band engages;

Fig. 16 is a face view of the end of a bread band having a hook portion of further modified form;

Fig. 17 is a face view of one end of a bread band provided with modified means with which the hook part of the band engages;

Fig. 18 is a face view of the end of a bread band having a hook portion of further modified form;

Fig. 19 is a face view of one end of a bread band provided with modified means with which the hook part of the band engages;

Fig. 20 is a face view of the end of a bread band having a hook portion of further modified form;

Fig. 21 is a face view of one end of a bread band provided with modified means with which the hook part of the band engages;

Fig. 22 is a face view of the end of a bread band having a hook portion of further modified form;

Fig. 23 is a face view of one end of a bread band provided with modified means with which the hook part of the band engages;

Fig. 24 is a face view of the end of a bread band having a hook portion of further modified form;

Fig. 25 is a face view of one end of a bread band provided with modified means with which the hook part of the band engages;

Fig. 26 is a face view of the end of a bread band having a hook portion of further modified form;

Fig. 27 is a face view of one end of a bread band provided with modified means with which the hook part of the band engages;

Fig. 28 is a face view of the end of a bread band having a hook portion of further modified form;

Fig. 29 is a face view of one end of a bread band provided with modified means with which the hook part of the band engages;

Fig. 30 is a face view of the end of a bread band having a hook portion of further modified form;

Fig. 31 is a face view of one end of a bread band provided with modified means with which the hook part of the band engages;

Fig. 32 is a face view of the end of a bread band having a hook portion of further modified form;

Fig. 33 is a face view of one end of a bread band provided with modified means with which the hook part of the band engages;

Fig. 34 is a face view of the end of a bread band having a hook portion of further modified form;

Fig. 35 is a face view of one end of a bread band provided with modified means with which the hook part of the band engages;

Fig. 36 is a face view of the end of a bread band having a hook portion of further modified form; and Fig. 37 is a face view of one end of a bread band provided with modified means with which the hook part of the band engages.

Similar reference characters refer to similar parts throughout the several views of the drawings.

The bread band shown in Figures 1 and 2 comprises a bottom portion $a$ which extends across the bottom of the loaf, an end portion $b$ having a plurality of slits 4 therein, and an end portion $c$ having a hook portion 1 at the end thereof. In the packaging of sliced bread, for example, slices of bread $s$ in loaf form are placed upon the bottom portion $a$ of the band with the edge of one of the outside slices in alignment with the locating score line $d$. The band is provided with a plurality of spaced score lines $e$ which permit the band to be bent around the edge of the outer slices so as to closely conform to the loaf. Score lines $f$ are provided near the hook end of the band for a similar purpose.

The locating score line $d$ is so placed that when the end slices of the loaf are placed thereon, the portion $c$ of the band will extend up over the end of the loaf and locate the hook portion 1 on top of the outer slices and on the end shoulder of the loaf. When the hook is so positioned, the same can be easily connected and disconnected to and from the slits 4 when only the very end of the loaf is unwrapped from its waxed wrapper or covering.

The body portion of the band shown in Figure 4 is also provided with a locating score line $d$ and loaf conforming score lines $e$ and $f$, as shown. The bottom portion $a$ of the band, however, is provided with an arcuate cutout 5 so as to cause the bottom portion $a$ of the band to more closely conform and hug the bottom of the loaf. A longitudinally extending crimp 6 at the other edge of the bottom portion $a$ of the band also facilitates the hugging action of the band against the bottom of the loaf.

The general form and shape of the bands shown in Figures 2 and 3 has already been disclosed in my Patent No. 1,840,425, issued January 12, 1932, and my copending applications, Serial No. 538,450, filed May 19, 1931, and Serial No. 568,893, filed October 15, 1931. The substance of the invention disclosed in this application is concerned with the various hooks and securing devices, by means of which the ends of the bands can be rapidly and effectively attached and detached from one another.

I have accordingly shown in Figures 2 and 3 a band having a plurality of spaced cuts 4 at one end thereof. These cuts are entirely within the body of the band and present in effect strap portions 8 therebetween. Various hooking means which will hereafter be described are adapted to be inserted in the cuts 4 to selectively and interlockingly engage with the straps 8. A sufficient number of cuts 4 may be provided to permit the band to be variously adjusted in size so as to band the sliced loaf together as slices are intermittently removed therefrom.

In Figure 9 I have shown the adjustable end $b$ of the band provided with a plurality of spaced cuts presenting tongues 32 therebetween. Each cut extends from the edge of the band inwardly and the cut comprises a part 30 which extends at an acute angle to the edge of the band and then a part 31 which extends substantially at right angles to the band. The cut part 30 facilitates the entry of the hooking device and presents in effect a cam surface 33 with which the hook engages, insuring a tight bending of the band around the loaf. The hook comes to rest within the cut part 31.

There is shown in Figure 11 a plurality of locking tongues 43 of slightly different form. Locking tongues 43 are defined by cuts which comprise the cutout part 42 extending at an angle to the edge of the band and presenting a cam surface 44 and cut 41 which extends substantially at right angles to the edge of the band. Each tongue is provided with a rounded end portion which facilitates the location of the hook device of the band for insertion within the slit parts 40 and 41.

A further form of securing means with which the hook portion of the band is adapted to engage is shown in Figure 13. A plurality of spaced cuts are provided entirely within the body of the band which define the strap portions 52 therebetween. Each cut comprises a center part 50 which extends substantially at right angles to the end of the band and wing parts 51 which branch off from the center part 50 of the cut at an angle. In this form of securing means the hooking device is first inserted into the slots 51 and then drawn downwardly so as to grip and interlock with the strap portion 52 located below the cut into which the hooking device is inserted.

In Figure 15 a further form of securing means is shown. Hooking devices so shaped as to provide a neck portion may be inserted into the cut 60 and then drawn into the throat shaped opening 61 so that parts of the hook will interlockingly engage with hip parts 62 which surround the throat opening 61.

In Figure 17 securing means are shown which consist of paired cuts 70 which are spaced apart and converge. A plurality of such converging cuts may be provided along the band for adjustability. Ears or other parts of the hooking device may be inserted into the paired cuts 70 so as to interlock with the surrounding parts of the band.

There is shown in Figure 35 a slightly modified form comprising the paired converging cuts 165 which meet along the center line of the band. The hooking device may be inserted into the cuts 165 and seat behind the shoulder portions 166 of the straps 167, thus preventing removal of the hooking device.

The band shown in Figure 19 is provided with securing means somewhat similar to the securing means provided in connection with the band shown in Figure 15. The securing means here shown comprise spaced openings in one end of the band. Each opening is in the shape of a key slot comprising a wide upper portion 80 into which the securing device may be inserted and a lower throat part 82 into which the hook device may be drawn to interlock with the shoulder portions 81 surrounding the key slot.

In Figure 21 securing means are provided which consists of arcuate moon shaped spaced openings 95 into which the hook device is adapted to be inserted and engage the strip of material 96 there-below. The moon shaped openings permit easy insertion of the hook device and the lip portion 97 of the strap member 96 operates to hold the device in place in hooking engagement until manually released.

There is shown in Figure 27 cuts 125 similar in general shape to the half moon cutouts 95 shown in Figure 21. The material surrounding the cuts 125 operates to grip the hook device to prevent disengagement thereof except when manually manipulated. The hook device may engage the strap portion 126 between the cuts 125 as well as the surrounding parts of the band.

The securing means shown in Figure 23 comprises spaced cuts confined entirely within the band. Each cut consists of a transverse slit part 105 and a wing slit part 106. The wing slit part 106 provides an entry for the securing device after which the securing device may be cammed up over the hump portion 107 of the intervening strap portions 108, thus assuring a tight fit of the band when it comes to rest within the horizontal slit part 105. The hook device also grips the strap portion 108 and the surrounding parts of the band.

Somewhat similar securing means are shown in Figure 29 wherein a plurality of spaced straight line slits 135 are provided in the band. The slits are confined entirely within the band and extend at an acute angle to the edge thereof. The strap portion 136 defined by the slits 135 thus provide a cam surface with which the hook device may engage and be tightened.

In Figure 25 a plurality of spaced key shaped cuts are provided, each cut having a pair of closely spaced longitudinal slits 117 which define a throat portion and a transverse cut 116 connecting the longitudinal cuts 117. Wing cuts 115 branch from the longitudinal cuts 117 and provide an easy entry for the hook device. The hook device may be so shaped as to seat behind and engage with the shoulder portions 118 to extend through the throat portion between the longitudinal slits 117 and to rest against the strap portions 119 between the key shaped cuts. The downwardly extending lip portion of the strap portion exerts a grip action on the hook device to normally retain the same in locked position.

In Figure 31 there is shown a plurality of spaced openings 145. Each opening comprises a transverse part and a wing part which facilitates the entry of the hooking device into the opening. The band engages the shoulder 147 of the strap 146 and is thus locked in place and removable only by a proper manual manipulation of the hooking device.

In Figure 33 the securing means are formed by a plurality of transverse cuts 156 and 158 confined within the band. The spaced cuts 156 and 158 define the strap portion 155 therebetween. With this type of securing means the hooking device may be threaded through the cuts 156 and 158 and seat behind the strap 155, thus locking the ends of the band together.

In Figure 37 a plurality of paired longitudinally extending cuts 175 are provided. Cuts 175 are adapted to receive the laterally extending ears on the hooking device, thus securely and removably connecting the opposite ends of the band.

The hooking device above referred to may take various shapes and forms dependent upon the securing means with which it is to engage. The hooking device 1 shown in Figures 2 and 3 is provided with a rounded neck portion 2 which facilitates the insertion or connection of this hook with the securing means. The hook device 1 is also provided with a nose or beak portion 3 which engages directly with the securing means and holds the same in secure fixed position.

Somewhat similar hooking devices are shown in Figures 8 and 10. The hooking device 25 shown in Figure 8 is provided with a nose portion 26 adapted to engage the securing means. A throat cutout 27 is provided in the neck portion 28 thereof to effect a more secure lock between the hooking device and the securing means. The hooking device shown in Figure 10 is provided with a rounded nose portion 36 to facilitate engagement between the hooking device and securing means. A throat cutout 37 is also provided for the purpose above described. The hooking devices 1, 25 and 35, shown in Figure 2, Figure 8 and Figure 10 respectively, are adapted for engagement and connection with the securing means shown in Figure 2, Figure 9, Figure 11, Figure 13, Figure 15, Figure 19, Figure 21, Figure 23, Figure 25, Figure 27, Figure 29, Figure 31, Figure 35 and Figure 37.

In Figure 6 a hooking device 15 is shown which extends from the front end of the band. This device is provided with a pair of ears 16 which extend laterally from the neck portion 17 thereof.

A somewhat similar hooking device is shown in Figure 7 comprising a head portion 20, lateral extending ears 21 and a neck portion 22. A modified hooking device 45 is shown in Figure 12 which is provided with lateral extending ears 46 and a neck portion 47. The ears 46 are provided with rearwardly extending portions 48 which are adapted to lock with the securing means to more effectively secure the ends of the band together. A securing device 65 in the form of a spear head is shown in Figure 16. This device is also provided with a pair of ears 66 extending from the neck portion 67 thereof.

In Figure 18 a securing device 75 in the form of a rounded spear head is shown, this device having ears 76 extending laterally from the neck portion 77 thereof. The hook devices shown in Figure 6, Figure 7, Figure 12, Figure 16 and Figure 18 are adapted to engage and interlock with the securing means shown in Figure 13, Figure 15, Figure 17, Figure 19, Figure 21, Figure 25, Figure 27, Figure 31, Figure 35 and Figure 37. A securing device 55 in the form of a blunt spear head is shown in Figure 14 comprising ears 56 extending laterally from the neck portion 57. This hook device is adapted for engagement with the securing means shown in Figure 15, Figure 19, Figure 25, Figure 31, Figure 35 and Figure 37.

The hook devices shown in Figure 20, Figure 22, Figure 24, Figure 26, Figure 28, Figure 30, Figure 32, Figure 34 and Figure 36, are all cut out of the body of the band as shown.

The hook device 90 shown in Figure 20 is formed by the converging cuts 91 and comprises a pointed reverse hook. The hook device 100 shown in Figure 22 is formed by the lateral cuts 101 and transverse cuts 102 and comprises a reverse blunt pointed hook.

The hook device 130 shown in Figure 28 is formed from the longitudinal cut 131 and the arcuate cut 132 and comprises a reverse hook. The arcuate portion 132 of this device facilitates engagement of the device with the securing means.

The hook devices shown in Figure 20, Figure 22 and Figure 28 are adapted for engagement with securing means shown in Figure 3, Figure 13, Figure 15, Figure 19, Figure 21, Figure 23, Figure 25, Figure 27, Figure 29, Figure 31, Figure 33 and Figure 35.

The hook devices shown in Figure 24, Figure 26, Figure 34 and Figure 36 are in certain respects similar to the devices shown in Figure 6, Figure 7 and Figure 18, except that they are incorporated into the body of the band. Hook device 110, shown in Figure 24, is provided with a pair of ears 111 formed by the cuts 112. Similarly, the hook device 120, shown in Figure 26, is in the form of a round spear head provided with ears 121 and neck portion 122 defined by the cut 123. The hook device 160, shown in Figure 34, is provided with laterally extending ears 161 and a rounded neck portion 162 formed by the rounded cut 163. The hook device 170 shown in Figure 36 is formed in the shape of a spear head having ear portions 171 and having a neck 172 defined by the cut 173. The hook devices shown in Figure 24, Figure 26, Figure 34 and Figure 36 are adapted to engage and interlock with the securing means shown in Figure 13, Figure 15, Figure 17, Figure 19, Figure 21, Figure 25, Figure 27, Figure 31, Figure 35 and Figure 37.

The hook device 140, shown in Figure 30, is somewhat similar to the hook device 1 shown in Figure 2, except that it is incorporated into the body of the band. The hook device is provided with a head portion 140 having a nose 143 and a neck 144. This hook device is formed by means of a cut 141 and an opening 142 below the nose portion 143. This hook device is adapted to engage the securing means shown in Figure 3, Figure 9, Figure 11, Figure 13, Figure 15, Figure 19, Figure 21, Figure 23, Figure 25, Figure 27, Figure 29, Figure 31, Figure 33, Figure 35 and Figure 37.

In Figure 32 a hook device 150 is defined by the parallel cuts 151 and the transverse cut 152 and comprises a reverse hook. This reverse hook is especially adapted for use in connection with the securing means shown in Figure 33, since it is readily adapted to be threaded through the parallel cuts 156 and 158, and beneath the strap portion 155. The securing device 150, however, may also be advantageously used in connection with the securing means shown in Figure 3, Figure 9, Figure 11, Figure 13, Figure 15, Figure 19, Figure 21, Figure 23, Figure 25, Figure 27, Figure 29, Figure 31, Figure 33 and Figure 35.

A variety of hook devices and securing means have been disclosed, each of which may be paired together to provide a satisfactory and rapidly attachable and detachable means for banding together bakery products. As above pointed out, the hook devices shown may be used interchangeably with a number of different securing means in which have been illustrated, and this invention is to be thus construed. All the combinations which may be made between the hook devices and securing means are illustrated and described.

While certain novel features of the invention have been disclosed and are pointed out in the annexed claims, it will be understood that various omissions, substitutions and changes may be made by those skilled in the art without departing from the spirit of the invention.

What is claimed is:

1. A band for sliced bread and other bakery products comprising, a strip of paperboard having a plurality of paired converging cuts at one end thereof defining securing means therebetween, and a hook device at the other end of said band adapted to selectively engage said securing means.

2. A band for sliced bread and the like comprising, a strip of paperboard having a plurality of spaced transverse cuts at one end thereof defining strap portions therebetween, and means at the other end of said band adapted to selectively engage said straps, said cuts being confined entirely within the band, each of said cuts comprising a center slit extending substantially at right angles to the edge of the band and wing slits extending at an acute angle to the edge of the band so as to facilitate engagement of said means with said straps.

3. A band for packaging bakery products comprising, a strip of paperboard having a plurality of spaced transverse cuts at one end thereof, a throat opening extending below each of said cuts, and means at the other end of said band and extending in substantially the same plane adapted to be selectively inserted into said cuts and drawn into the throat opening to interlock with the surrounding parts of the band.

4. A band for packaging bakery products comprising, a strip of paperboard having a pair of spaced converging cuts at one end of said band confined within the longitudinal edges of said band, and means having parts adapted to be inserted into said paired cuts to interlock the ends of said strip, said paperboard material forming a continuous enclosing border around said cuts.

5. A band for packaging bakery products comprising, a strip of paperboard having a plurality of spaced openings at one end thereof, each opening having a wide part and a throat part extending below said wide part, and means at the other end of said band cut out from the material forming the band adapted to be inserted into one of said openings and drawn into the throat part to interlock said means with the surrounding parts of the strip.

6. A band for sliced bread and the like comprising, a strip of paperboard having a plurality of spaced cuts at one end confined entirely within the strip, each cut having a throat part and wing parts extending from the throat part, and means adapted to be inserted into the wing parts of the cut and drawn into the throat part to interlock said means with the surrounding parts of the strip.

7. A band for packaging bakery products comprising, a strip of paperboard having a plurality of spaced cuts at one end thereof confined entirely within the strip, each of said cuts comprising a transverse slit portion and a wing slit portion, and means at the other end of said band adapted to be inserted into the wing slit and moved into the transverse slit to releasably lock said means with the surrounding parts of said strip.

8. A band for sliced bread and the like comprising, a strip of paperboard having a plurality of spaced cuts at one end thereof, each of said cuts extending at an acute angle toward the edge of the band but confined entirely within the strip, and means at the other end of said band adapted to be inserted into said cuts and interlock with the surrounding parts of said strip, said paperboard material forming a continuous enclosing border around said cuts.

9. A band for sliced bread and the like comprising, a strip of paperboard having a plurality of spaced openings confined within the band, each opening having a transverse bottom part and a wing part, and means adapted to be inserted into the wing part and then drawn into the bottom part to interlock said means with the surrounding parts of the strip.

10. A band for sliced bread and the like comprising, a strip of paperboard having a pair of converging cuts at one end thereof confined entirely within the strip, and means at the other end of said strip having parts adapted to be inserted into said cuts to interlock said means with the surrounding parts of the band, said paperboard material forming a continuous enclosing border around said cuts.

11. A band for sliced bread and the like comprising, a strip of paperboard having a pair of spaced longitudinally extending converging cuts at one end thereof confined entirely within the strip, and means at the other end of said strip having parts adapted to be inserted into said paired cuts to interlock the parts of said strip together, said paperboard material forming a continuous enclosing border around said cuts.

OLIVER B. ANDREWS.